(12) United States Patent
Sharp

(10) Patent No.: US 9,064,234 B2
(45) Date of Patent: Jun. 23, 2015

(54) SYSTEMS AND METHODS FOR THE ANALYSIS AND DISSEMINATION OF DATA WITHIN A NETWORKED COMMUNITY

(75) Inventor: Charles L. Sharp, Salt Lake City, UT (US)

(73) Assignee: RIGHT INTEL CORPORATION, Salt Lake City, UT (US)

(*) Notice: Subject to any disclaimer, the term of this patent is extended or adjusted under 35 U.S.C. 154(b) by 202 days.

(21) Appl. No.: 13/549,194

(22) Filed: Jul. 13, 2012

(65) Prior Publication Data

US 2013/0018959 A1 Jan. 17, 2013

Related U.S. Application Data

(60) Provisional application No. 61/507,455, filed on Jul. 13, 2011.

(51) Int. Cl.
*G06F 17/30* (2006.01)
*G06Q 10/10* (2012.01)
*G06Q 50/00* (2012.01)

(52) U.S. Cl.
CPC ............... *G06Q 10/10* (2013.01); *G06Q 50/01* (2013.01)

(58) Field of Classification Search
CPC ......... G06F 19/00; G06F 17/00; G06F 17/30; G06F 17/40; G06F 7/00; G06F 3/00; G06F 3/048; G06F 9/44; G06F 15/16; G06F 15/18; G08B 23/00; G06Q 10/00; G06Q 50/24; G06Q 30/02; H04L 29/06; A61B 5/02; G07F 7/00
USPC ............... 709/103–104, 201–202, 203–204; 707/10
See application file for complete search history.

(56) References Cited

U.S. PATENT DOCUMENTS

| | | | |
|---|---|---|---|
| 5,555,191 A * | 9/1996 | Hripcsak .................... 709/224 |
| 5,732,383 A * | 3/1998 | Foladare et al. ........... 455/456.5 |
| 5,878,029 A * | 3/1999 | Hasegawa et al. ............ 370/236 |
| 6,339,774 B1 * | 1/2002 | Nakayama et al. ................... 1/1 |
| 7,092,914 B1 * | 8/2006 | Shear et al. ...................... 705/67 |
| 7,260,630 B1 * | 8/2007 | Mongiovi ..................... 709/224 |
| 8,166,026 B1 * | 4/2012 | Sadler .......................... 707/725 |
| 8,224,507 B2 * | 7/2012 | Edwards et al. ................ 701/16 |
| 8,689,114 B2 * | 4/2014 | Muller et al. ................. 715/751 |
| 2001/0010046 A1 * | 7/2001 | Muyres et al. ................. 705/52 |
| 2002/0029208 A1 * | 3/2002 | Josephson ........................ 707/1 |
| 2002/0161764 A1 * | 10/2002 | Sharo ............................. 707/7 |
| 2005/0171833 A1 * | 8/2005 | Jost et al. ........................ 705/10 |
| 2005/0190061 A1 * | 9/2005 | Trela .......................... 340/573.1 |
| 2007/0076584 A1 * | 4/2007 | Kim et al. ..................... 370/206 |

(Continued)

OTHER PUBLICATIONS

Intelligence Collection and Analytical Methods United States Department of Justice Cruz, Frank Sep. 10, 1987.*

(Continued)

*Primary Examiner* — Brian J Gillis
*Assistant Examiner* — Boris Grijalva Lobos
(74) *Attorney, Agent, or Firm* — Holland & Hart LLP

(57) ABSTRACT

A computer-implemented method for analyzing and disseminating data within a networked community is described. It is determined whether to gather data from a variety of data sources. Members of the networked community may also contribute data. The data is gathered and provided to an administrator of the networked community. Upon being analyzed, the data is disseminated to the members of the networked community.

15 Claims, 11 Drawing Sheets

(56) References Cited

U.S. PATENT DOCUMENTS

| | | | |
|---|---|---|---|
| 2007/0192347 A1* | 8/2007 | Rossmark et al. | 707/101 |
| 2007/0271413 A1* | 11/2007 | Fujibayashi et al. | 711/112 |
| 2008/0059466 A1* | 3/2008 | Luo et al. | 707/7 |
| 2008/0120545 A1* | 5/2008 | Geyer et al. | 715/715 |
| 2008/0140484 A1* | 6/2008 | Akerman | 705/7 |
| 2008/0157960 A1* | 7/2008 | Muller et al. | 340/540 |
| 2008/0313326 A1* | 12/2008 | Maruyama et al. | 709/224 |
| 2009/0049053 A1* | 2/2009 | Barker et al. | 707/10 |
| 2009/0055477 A1* | 2/2009 | Flesher et al. | 709/204 |
| 2009/0100357 A1* | 4/2009 | Signorini et al. | 715/760 |
| 2009/0234876 A1* | 9/2009 | Schigel et al. | 707/102 |
| 2010/0061476 A1* | 3/2010 | Kim et al. | 375/265 |
| 2010/0211653 A1* | 8/2010 | Creemer et al. | 709/219 |
| 2010/0235788 A1* | 9/2010 | Zappa et al. | 715/811 |
| 2010/0283606 A1* | 11/2010 | Tsypin et al. | 340/540 |
| 2011/0035681 A1* | 2/2011 | Mandel et al. | 715/752 |
| 2012/0010995 A1* | 1/2012 | Skirpa et al. | 705/14.49 |
| 2012/0023142 A1* | 1/2012 | Diorio et al. | 707/805 |
| 2012/0173580 A1* | 7/2012 | Diorio et al. | 707/781 |
| 2012/0191783 A1* | 7/2012 | Yang | 709/204 |
| 2012/0209628 A1* | 8/2012 | Tamis et al. | 705/3 |
| 2012/0209705 A1* | 8/2012 | Ramer et al. | 705/14.51 |
| 2012/0210247 A1* | 8/2012 | Khouri et al. | 715/751 |
| 2013/0304802 A1* | 11/2013 | Assadollahi | 709/203 |
| 2013/0305377 A1* | 11/2013 | Herz | 726/25 |
| 2013/0311562 A1* | 11/2013 | Platt et al. | 709/204 |
| 2014/0013194 A1* | 1/2014 | Zongker | 715/205 |
| 2014/0019575 A1* | 1/2014 | Alexander, Jr. | 709/213 |
| 2014/0026082 A1* | 1/2014 | Dodson et al. | 715/760 |
| 2014/0046569 A1* | 2/2014 | Mohn et al. | 701/99 |
| 2014/0067837 A1* | 3/2014 | Sadhuka et al. | 707/758 |

OTHER PUBLICATIONS

When do we trust an information source? http://www.crisscrossed.net Kreutz, Christian Jan. 8, 2010.*

When do we trust an information source?, Christian Kreutz, Jan. 8, 2010.*

* cited by examiner

FIG. 4

Add a user

An invitation will be sent to new users. They will be able to define user password and add personal information First name Last name Email Assign a level of access for this user Member Indicate a personalized note with the invitation approval:

Enter personalized info here

Add this user users
data source
activity intelligence | reporting | synthesis | publish | email | admin

FIG. 9

SYSTEMS AND METHODS FOR THE ANALYSIS AND DISSEMINATION OF DATA WITHIN A NETWORKED COMMUNITY

CROSS REFERENCE TO RELATED PATENT APPLICATIONS

This patent application claims the benefit of U.S. Provisional Patent Application No. 61/507,455 entitled "Systems and Methods for the Analysis and Dissemination of Data Within a Networked Community" filed on 13 Jul. 2011, the entire contents of which are incorporated by reference herein.

BACKGROUND

The use of computer systems and computer-related technologies continues to increase at a rapid pace. Computer systems have increasingly become an integral part of both the social and business worlds and the activities of individual consumers. Computer systems may be used to carry out all manner of business, industry, and academic endeavors. The wide-spread use of computers has been accelerated by the increased use of computer networks, including the Internet and, more recently, social media networks, such as, for example, FACEBOOK®, TWITTER®, etc.

One particular aspect of the Internet is that it makes information of all variety, from a variety of sources, readily available. An organization stands to benefit by making a wide range of information available to users within its organization. The wide range of data sources and the availability of information, including over the Internet, can in some instances allow users to be more efficient in their responsibilities within the organization. Savvy organizations may seek to gather and analyze the data in order to present it to users within the organization in a way that is most beneficial to that organization and/or its users.

These realties can pose various challenges, however. For example, the volume of information makes it difficult for an organization to pinpoint the data that is the most pertinent to that particular organization's purposes. As a second example, the number of sources of information can make it difficult for organizations to identify the sources of data that are most likely to have pertinent information for that organization. A third example of a challenge posed is that time spent reviewing and analyzing data as it is made available can prevent collaboration between all interested parties of the community regarding how to optimize the analysis and dissemination of available data.

A need exists for organizations consisting of or housing communities for improved integration, analysis, and dissemination of data within those communities.

SUMMARY OF EMBODIMENTS OF THE INVENTION

According to at least one embodiment, a computer-implemented method for the analysis and dissemination of data within a networked community is described. It is determined whether to gather data from within a plurality of data sources for analysis. Data is gathered from the plurality of data sources according to a frequency assigned by an administrator of the networked community. A member of the networked community is granted the ability to contribute data to the networked community. The administrator of the networked community is provided with a set of data gathered from the plurality of data sources and the member of the networked community for analysis. The administrator of the networked community is provided with the ability to analyze the set of data, in part by determining a portion of data within the set of data to disseminate and further in part by determining how the portion of data should be disseminated. The analyzed data is disseminated to the members of the networked community according to individualized settings associated with the members of the networked community.

In one embodiment, a weight is applied to a first grouping of the plurality of data sources to determine whether to gather data from the first grouping of the plurality of data sources. A data source identity is used within a second grouping of the plurality of data sources to determine whether to gather data from the second grouping of the plurality of data sources. A data source popularity is used within a third grouping of the plurality of data sources to determine whether to gather data from the third grouping of the plurality of data sources.

In another embodiment, the administrator of the networked community is provided with the ability to instruct a gathering of data from at least one of the plurality of data sources at any particular moment. The administrator of the networked community is also provided with the ability to assign the weight applied to the first grouping of the plurality of data sources.

In yet another embodiment, the individualized settings associated with the members of the networked community are determined by preferences set by the members of the networked community.

In yet another embodiment, a page is electronically provided for members of the networked community to interact with the analyzed data. The members of the networked community are allowed to bring together posts of the analyzed data from the page into threads. Documents are allowed to be attached to the threads.

A computing device configured to analyze and disseminate data within a networked community is also described. The computing device may include a processor and memory in electronic communication with the processor. The computing device may also include a software module configured to complete the above steps.

A computer-program product for analyzing and disseminating data within a networked community is also described. The computer-program product may include a non-transitory computer-readable medium having instructions thereon. The instructions may include code programmed to complete the above steps.

The foregoing, together with other embodiments, features, and advantages will become more apparent in view of the following detailed description, claims, and accompanying drawings.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a subsequent screenshot image illustrating aspects of the gathering of data that may be incorporated into the systems and methods of FIG. 1.

FIG. 9 is a screenshot image illustrating additional administrative aspects of the systems and methods of FIG. 1.

Figure 1:
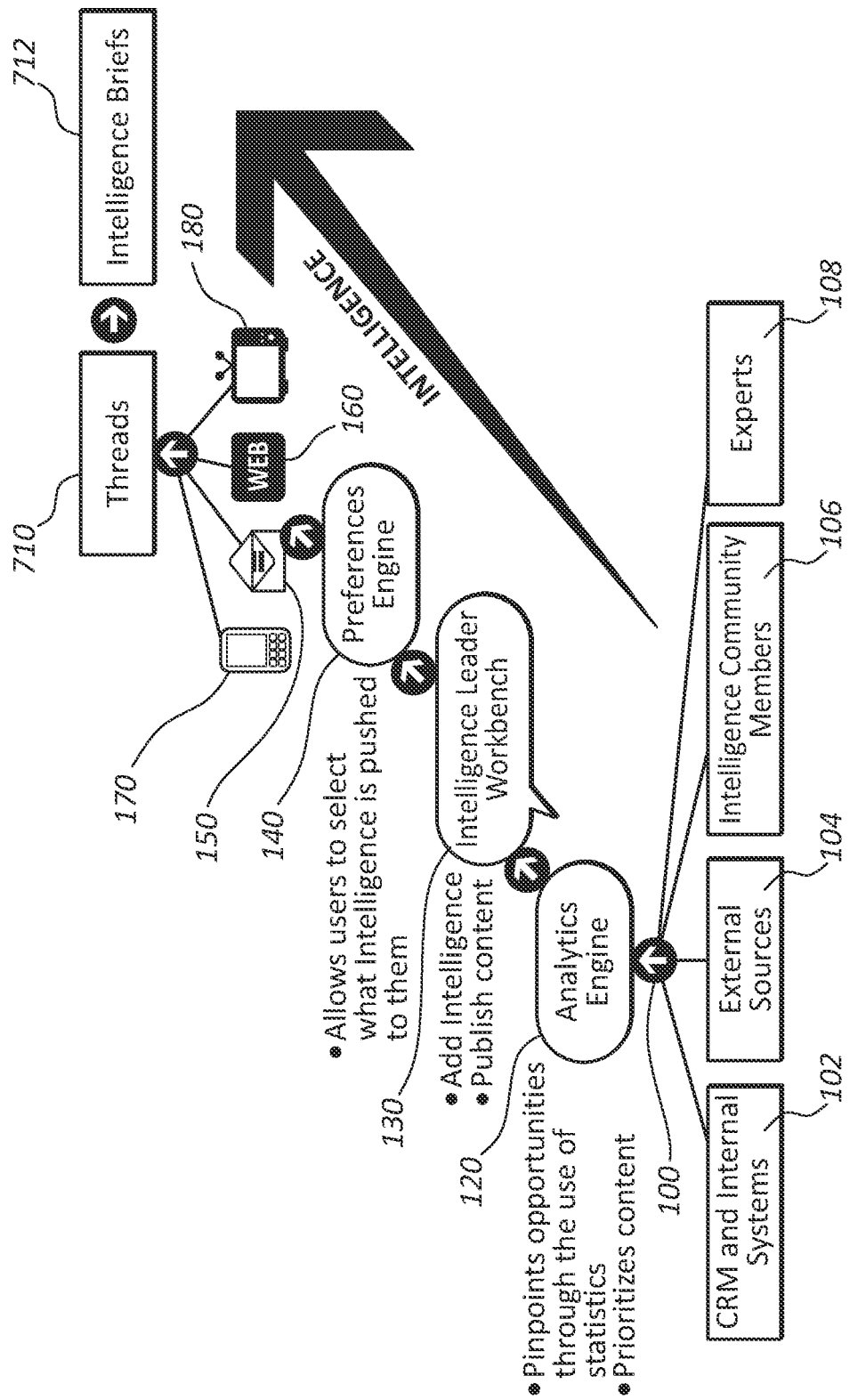
FIG. 1 is a block diagram illustrating one embodiment of the analysis and dissemination of data within a community that implements aspects of the present systems and methods.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is directed to the integration, analysis, and dissemination of data within a networked community. The example systems and methods disclosed herein integrate data from a variety of sources, analyze it, and disseminate it in a form that is useful to members of the community, sometimes referred to as the intelligence community. This community is sometimes contained within, or comprises, an organization or entity standing to benefit from the intelligence disseminated.

Referring now to FIG. 1, data 100 is integrated from internal data sources 102 including web analytics tools, other internal databases, and the customer relationship management (CRM) system employed by the entity. Additionally, data may be gathered from external data sources 104 such as external RSS feeds from websites, social media systems including FACEBOOK® and TWITTER®, and web search tools such as GOOGLE®. Data 106 from intelligence community members can also be integrated, as members share articles they have read or their thoughts on a specific topic. Data 108 from experts in the industry, including those that have been hired to provide their insights, can also be integrated into the platform. Data 100 that is integrated into the system can come from any other desirable data source.

Data 100 is submitted into a data analytics engine 120 according to methods known in the art. The engine 120 prioritizes the information through the use of statistics and predefined business rules. The algorithms performed by the engine can cull through the data to find anomalies, defined by the settings of the engine 120.

Data passes from the data analytics engine to a workbench 130. The workbench 130 can be administered by a leader or administrator, referred to herein as the intelligence leader. The data can be formed into a post containing intelligence that is transmitted to the workbench 130 in order for the intelligence leader to be able to analyze it. In one exemplary embodiment, the analytics engine 120 might analyze the entity's website traffic over a given period of time. During this process the analytics engine 120 will compare traffic with historical averages. If the analyzed traffic falls outside of some predetermined normal or acceptable range, a post is generated and sent to the intelligence leader for additional analysis.

The analysis of data can vary according to the source of the data in question or according to the intelligence leader's desires. For instance, when the intelligence leader adds a data source to the system, he or she can apply a weight to that source. This weighting is taken into consideration by the analytics engine 120 in determining the analysis of the data and the priority with which that data is transmitted to the workbench 130.

As another example of the type of analysis performed on the possibly massive amount of data 100 entering the system, the analytics engine 120 can determine which messages (called "tweets" when sent from accounts held on the microblogging and social networking site website TWITTER®) broadcast from sources that have been integrated into the system should be submitted to the intelligence leader for analysis. For instance, the engine may transmit a message to the workbench 130 based in part on the popularity of the message and/or the person who submitted the message. By receiving only the most important messages, the intelligence leader is able to more quickly perform his or her responsibilities with respect to the incoming data.

Once reviewed and analyzed by the intelligence leader, data becomes intelligence. Intelligence leaves the workbench 130 and is received by intelligence community members at the discretion of the intelligence leader according to the preferences of each member. A preferences engine 140 enables the intelligence community member to customize the intelligence that the member is to receive and the method by which the member will receive it.

One of the methods by which community members may receive intelligence is HTML-based emails 150. By this method, intelligence is sent to a member in an email containing any combination of text, graphics, and active links to websites either internal or external to the present system. Another method by which community members may receive intelligence is by a community site 160 provided with the present system. The site 160 may be a website accessible via the Internet or it may be internal to the entity. The site 160 houses posts generated by the intelligence leader and the analytics engine as well as other information relevant to community members, and allows members to interact with the intelligence and with each other. Alternatively or in addition, the email 150 can contain links to external websites.

An additional method by which community members can receive intelligence is via mobile devices such as personal digital assistants, cellular telephones having data capabilities, or so-called smartphones. The system includes a mobile application 170 which will allow the community members to interact with the intelligence and with each other via a mobile device.

Yet another method by which community members can receive intelligence under the present system and methods is via monitor displays 180 that are strategically placed inside departments of the entity or entities in which the community is found.

Figure 2:
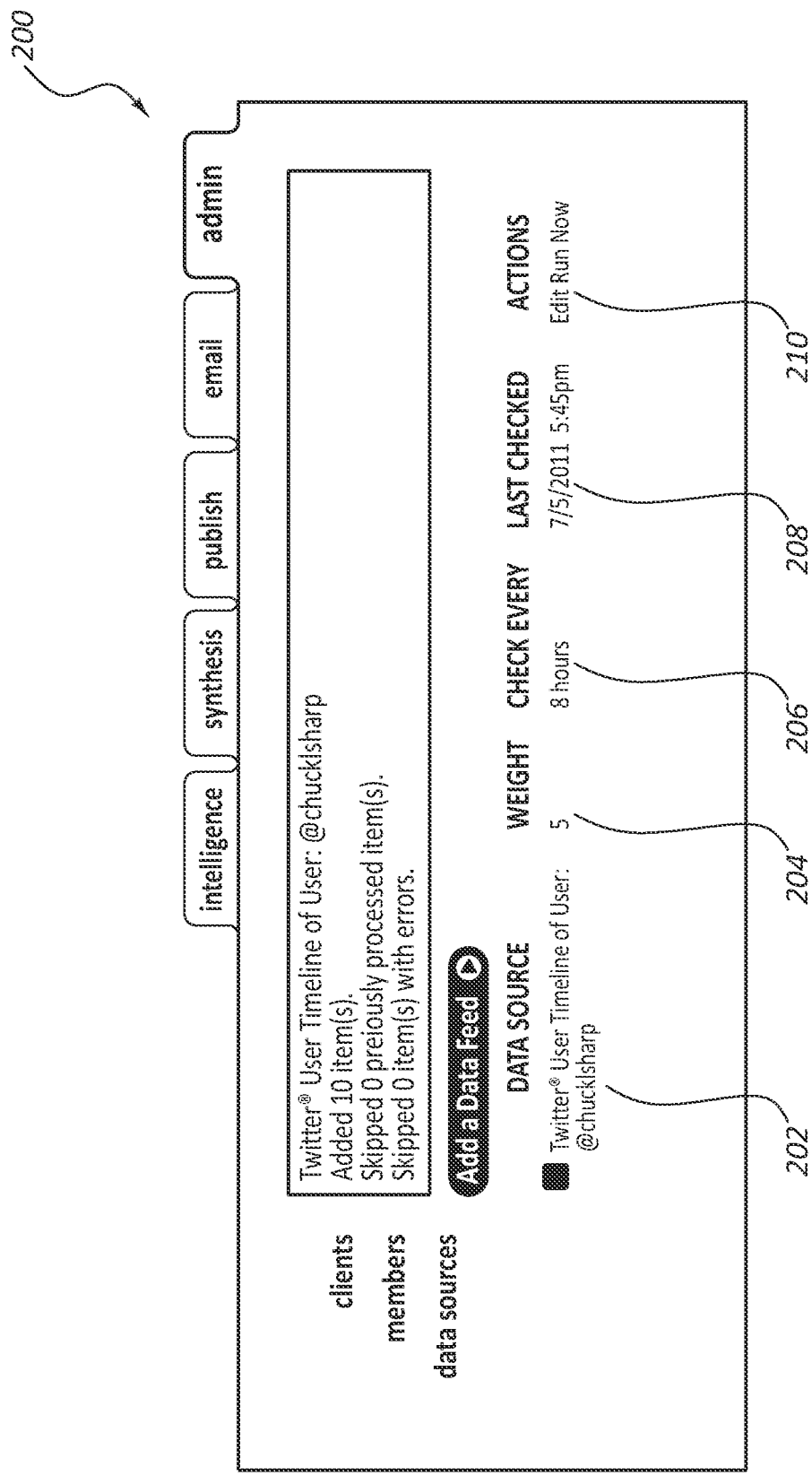
FIG. 2 is a screenshot image illustrating administrative aspects of the systems and methods of FIG. 1.

In the exemplary embodiment of FIG. 2, a data integration page 200 of the present system is shown. On this page the intelligence leader can add any data source 202 desired to be integrated into the system, including those discussed by way of example herein: RSS feeds, microblogging and social networking websites including TWITTER®, news articles or alerts pulled from internet search engines, and the entity's internal systems. In addition to adding the data source 202, the intelligence leader can assign a weight 204 to that data source, a frequency 206 with which the data is to be gathered from the data source, all of which will be taken into account by the analytics engine 120. The data integration page also gives the intelligence leader information 208 on the most recent gathering of data from any particular data source. Additionally, the data integration page 200 gives the intelligence leader the option to gather data from the source at that particular moment, by including a link 210 which activates the data gathering function of the system, which link is shown in the exemplary embodiment of FIG. 2 as "Run Now."

With respect to data coming from the microblogging and social networking website TWITTER®, the intelligence leader can integrate all messages broadcast from a specific account. In the exemplary embodiment shown in FIG. 2, the weight 204 of "5" with the data gathering frequency 206 of "8 hours" has been assigned to all messages sent from the TWITTER® account @chucklsharp. In addition, TWITTER® allows its users to emphasize certain words in messages by placing the pound sign with them, i.e., #politics. Such words are referred to as "hashtags." The intelligence leader can designate all messages having specific hashtags or even specific terms as a data source. Additionally, the intelligence leader can designate all messages that mention a specific account user or any other sort of information desired.

Figure 3:
FIG. 3 is a screenshot image illustrating aspects of the gathering of data that may be incorporated into the systems and methods of FIG. 1.
Figure 4:
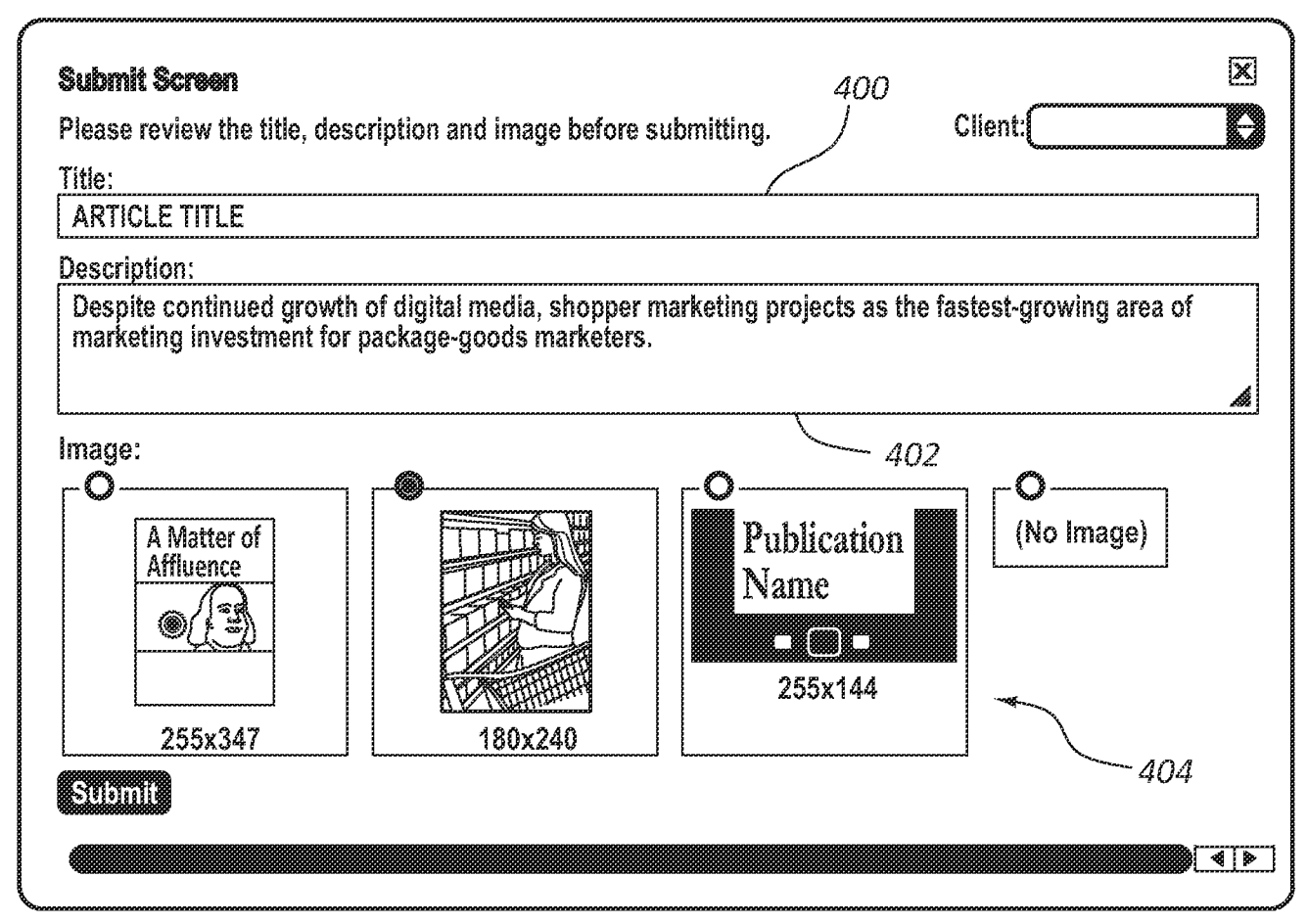

FIGS. 3-4 demonstrate one way in which community members interact with the present system and yet another way by which data is gathered into the present system. A bookmarklet 300 can be added to a community member's browser according to known methods, including by simply dragging it onto the member's list of bookmarks. When a member sees an article or webpage they would like to share with the intelligence community they are able to do so by clicking on the bookmarklet 300.

Referring now to FIG. 4, the bookmarklet 300 can be configured to pull contents from a member-chosen webpage and bring it into the system. Any desired information concerning the member-chosen webpage may be submitted to the intelligence leader for analysis. In the exemplary embodiment of FIG. 4, the title 400 of an article, a description 402 of the article, and an image selection option 404 are presented to the member submitting the article. By this means, the member has the ability to add his or her own edits and comments to the information and then submit the data to the intelligence leader for analysis.

Figure 5:
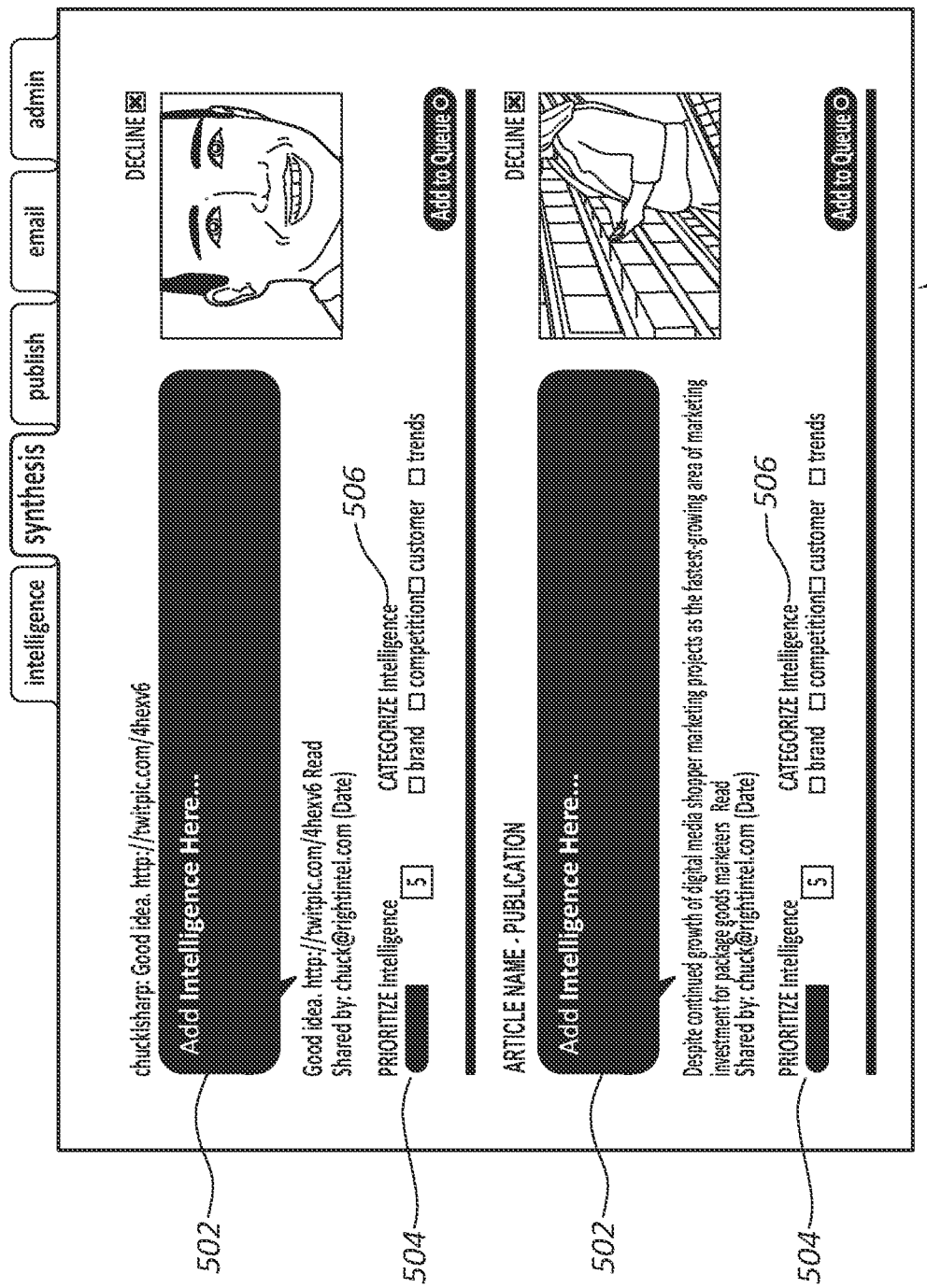
FIG. 5 is a screenshot image illustrating aspects of the systems and methods of FIG. 1.

FIG. 5 demonstrates how the intelligence leader interacts with the data according to the present systems and methods. On a synthesis page 500, the intelligence leader reviews the information that has been added into the system by any method, including that which has already been processed and prioritized by the data analytics engine 120. The data is received in the form of various posts, which may refer any piece of data that packaged together such as an article, chart, graph, thought, message, image, or document. The intelligence leader can write a short summary 502 of a post that has entered the synthesis process, can add a priority 504 to the post, and can place each post into one or more categories 506. The intelligence leader can choose to decline posts that are not important or add additional posts to a queue of posts that are more pertinent to the community's purpose.

Figure 6A:
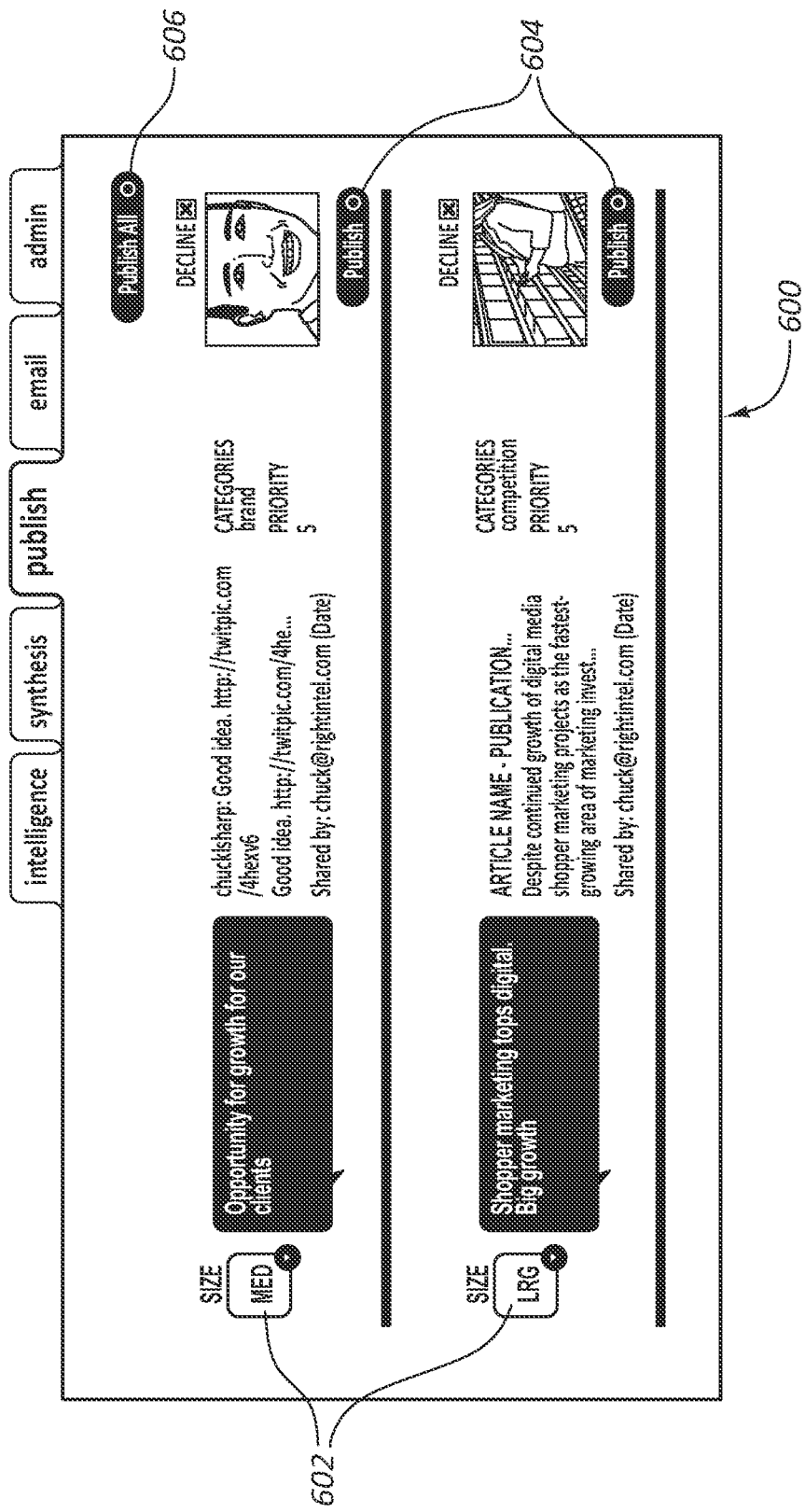
FIGS. 6A and 6B are screenshot images illustrating aspects of the systems and methods of FIG. 1.
Figure 6B:
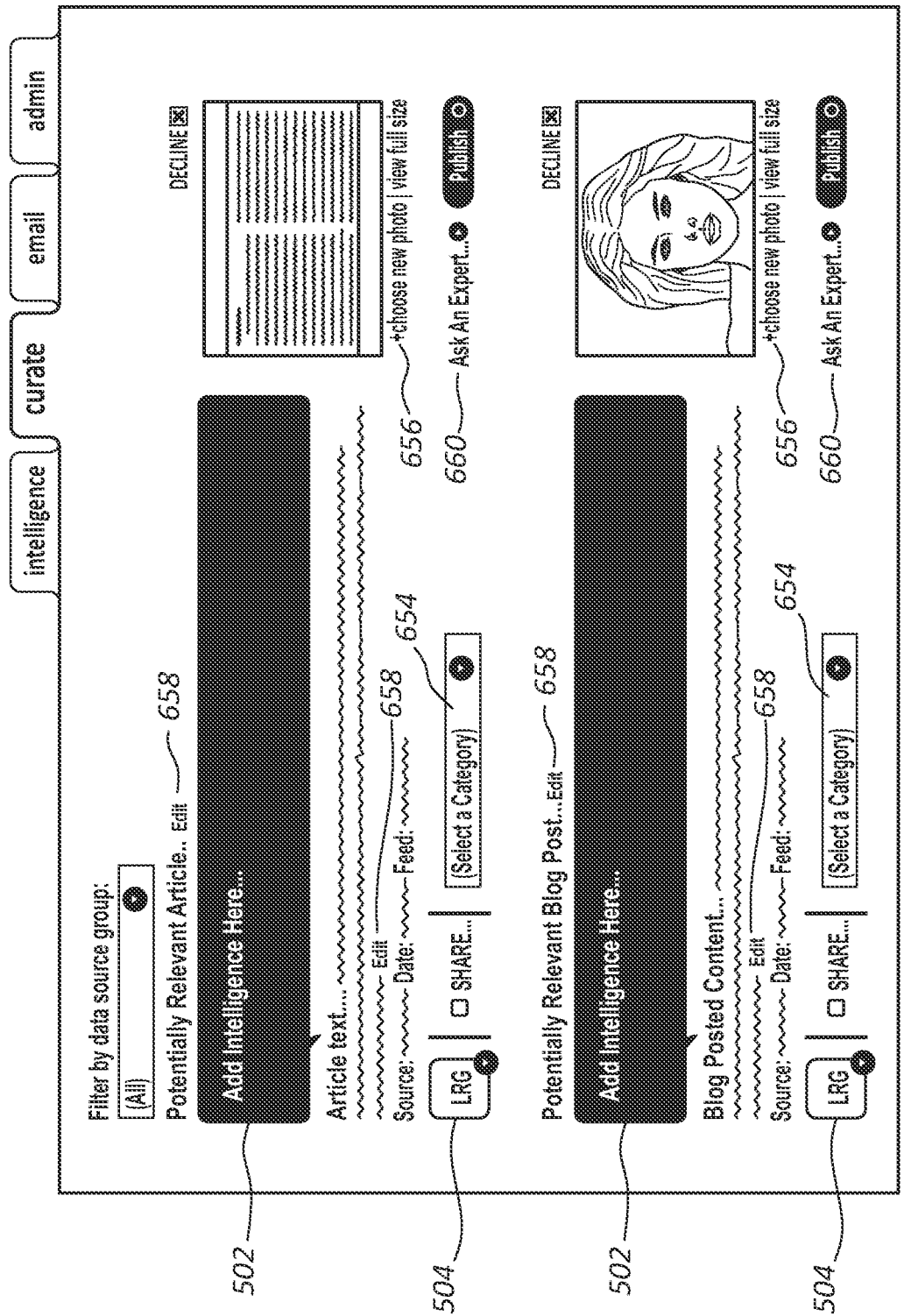
Figure 7:
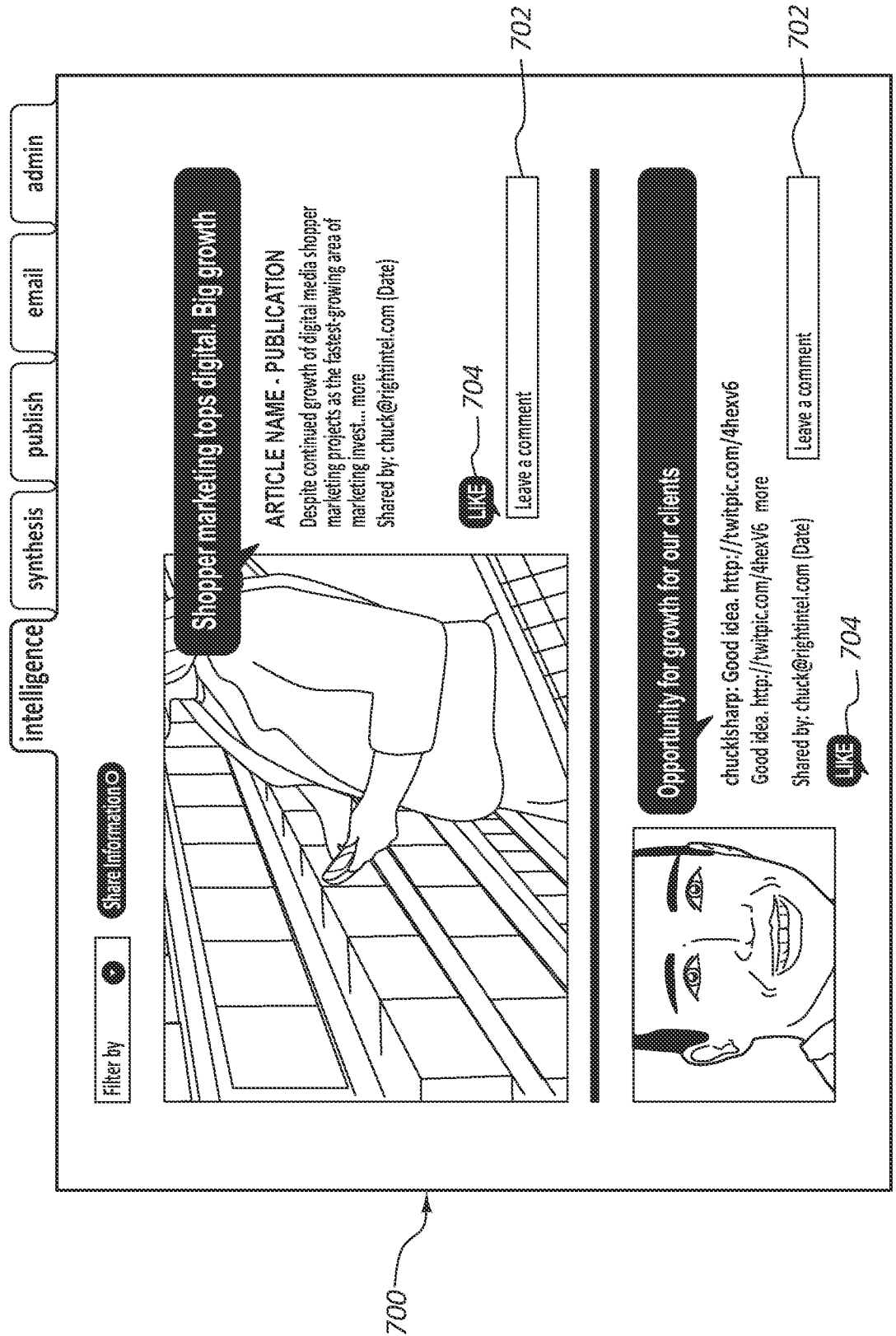
FIG. 7 is a screenshot image illustrating the intelligence-disseminating aspects of the systems and methods of FIG. 1.

FIGS. 6A-7 show a method of publishing posts to the intelligence community. On a publish page 600 shown in the exemplary embodiment of FIG. 6A, the intelligence leader determines, by actuating order buttons 602, the order the posts should appear on the page presented to the community, which page is referred to as the intelligence page. The intelligence leader may click or otherwise actuate the publish button 604 to send intelligence to the intelligence page. A separate publish all button 606 may be used to send all queued intelligence to the intelligence page. The process of deciding which intelligence to send to the intelligence page is sometimes referred to as curation.

The synthesis page 500 may be combined with the publish page 600 into a curate page 650 shown in the exemplary embodiment of FIG. 6B. The intelligence leader may choose the data source groups to view for curation by selecting from a drop down menu, for example. The intelligence leader can include summaries 502 and add priority 504 to the data. The intelligence leader can also categorize the data. In the exemplary embodiment shown in FIG. 6B, the intelligence leader categorizes the data by selecting from a category drop down menu 654. The intelligence leader can determine the photo or graphic to be presented to the community by actuating a selection link 656. The intelligence leader may also choose to edit the information presented from the data source by actuating edit links 658. The intelligence leader also can choose to send the data to another individual who has expertise in a particular field by actuating an expert link 660.

FIG. 7 illustrates how an intelligence page 700 may appear. On the intelligence page, intelligence community members see the posts that the intelligence leader has deemed relevant, as the intelligence leader has elected to present them. Members have the ability to add comments 702 to posts and classify the post as being beneficial to their purposes using buttons or links 704 that so indicate. When community members add a comment or classify a post, the person who added it may receive an email notifying him or her of the activity taking place on the post. A list of top contributors to the community may also be shown on this page. The system may include functionality that counts the number of posts, comments and classifications submitted by members of the community. Those members with the greatest activity will be listed as top contributors.

Referring again to FIG. 1, the present invention also allows members to bring together a collection of posts under a common theme. Such a collection is referred to herein as a thread 710. A member may create a thread and add to it as additional posts are created. As threads are formed and areas of interest emerge, documents 712 can be attached to the threads. The documents, which may be referred to as briefs, are prepared in any known program and provide strategic, forward-looking guidance on the area of interest presented in the thread, for the benefit of those in the community.

Figure 8:
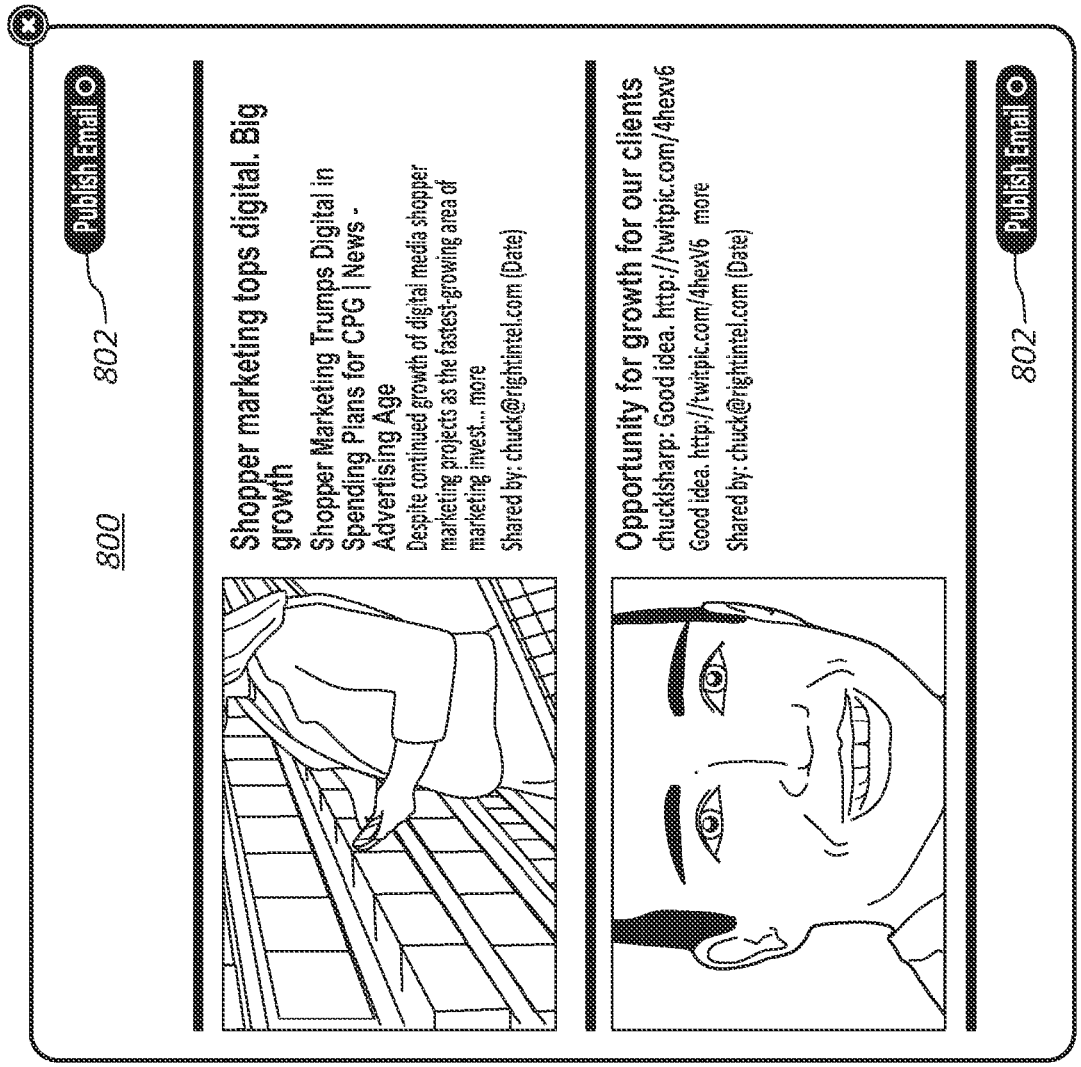
FIG. 8 is a screenshot image illustrating the intelligence-disseminating aspects of the systems and methods of FIG. 1.

FIG. 8 illustrates a method by which intelligence is disseminated to community members using email. In the exemplary embodiment of FIG. 8, an email page 800 gives the intelligence leader the ability to review all published posts and determine which posts should be disseminated to the intelligence community via email. The intelligence leader can then publish the email and have it disseminated to the community using links or buttons 802.

FIG. 9 illustrates a method by which the present system is administered in part. An administration page 900 allows the intelligence leader to add new community members by entering key information into various fields 902. Other administration functionality includes: deleting and editing members, providing members with different levels of access within the system, helping members with lost passwords, viewing usage logs inside of the application, and adding, deleting, and editing data sources.

Figure 10:
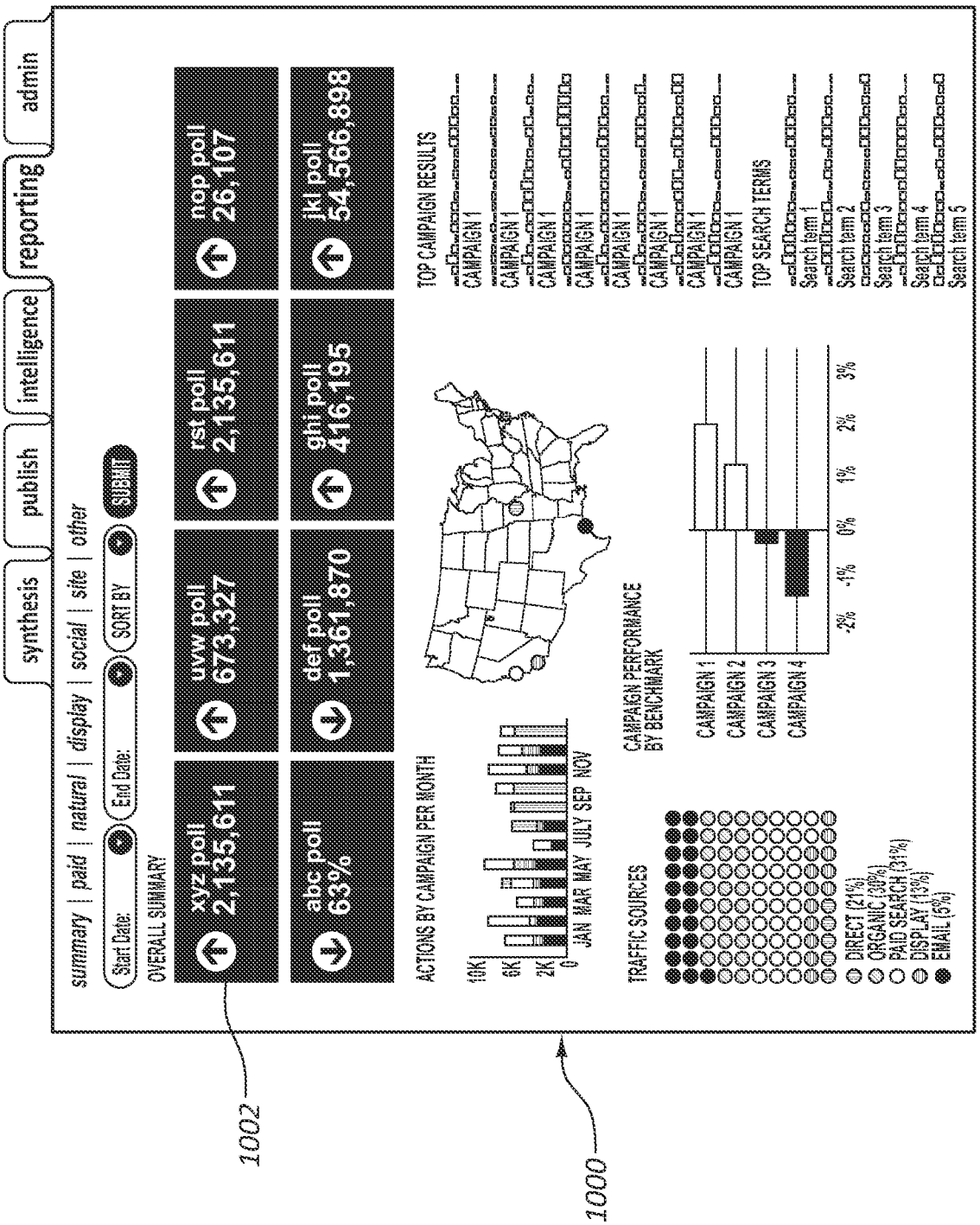
FIG. 10 is a screenshot image illustrating data-analyzing and intelligence-disseminating aspects of systems and methods in accordance with the present disclosure.

FIG. 10 is a screenshot of a reporting page 1000. On this page, key performance indicators (KPIs) 1002 relating to an entity's website or other online presences can be shown. Shown in the exemplary embodiment of FIG. 10 are some of the top KPIs that members may want to view on a regular basis, such as total visits to the entity's website, sources of traffic to the website, etc. The present disclosure contemplates that the reporting page 1000 could also incorporate and/or display an application from another entity that further analyzes and presents relevant information, including applications known in the art as "dashboards." The reporting page 1000 allows members of the community to be aware of both the information made available to the community on the intelligence page and the information concerning the public's interaction with the entity, which information can aid the community's and the entity's decision-making processes with respect to the entity's online presences.

The operation of a computer system to implement the present disclosure is readily known in the art and is not discussed in this application. Code to implement the present disclosure can be stored in computer-readable medium such as one or more of system memory, fixed disk, optical disk, or floppy disk.

While various embodiments have been described and/or illustrated herein in the context of fully functional computing systems, one or more of these exemplary embodiments may be distributed in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

What is claimed is:

1. A computer-implemented method for the analysis and dissemination of data within a networked community, comprising:
   determining, via a processor, whether to gather data from within a plurality of data sources for analysis;
   gathering, via the processor, data from the plurality of data sources according to a frequency assigned by an administrator of the networked community;
   granting, via the processor, a first at least one member of the networked community the ability to contribute data to the networked community;
   providing, via the processor, the administrator of the networked community with a set of data gathered from the plurality of data sources and the first at least one member of the networked community for analysis;
   providing, via the processor, the administrator of the networked community with the ability to analyze the set of data, in part by determining a portion of data within the set of data to disseminate and further in part by determining how the portion of data should be disseminated;
   disseminating, via the processor, analyzed data to a second at least one member of the networked community according to settings associated with the second at least one member of the networked community;
   comparing, via the processor, data traffic in the set of data to an historical average of traffic data associated with at least one of the plurality of data sources;
   determining, via the processor, whether the data traffic in the set of data satisfies a predetermined range of data traffic based on the historical average of traffic data;
   upon determining the data traffic in the set of data satisfies the predetermined range of data traffic, generating, via the processor, a post and sending the post to the administrator of the networked community;
   sorting, via the processor, a plurality of posts by category;
   bundling, via the processor, posts of one category into a thread, the thread enabling members of the network community to view the bundled posts by selecting the thread; and
   appending, via the processor, one or more intelligence briefs to the thread of bundled posts, the intelligence briefs providing client strategy and guidance in relation to the category of the bundled posts.

2. The method of claim 1, wherein the step of determining whether to gather data from the plurality of data sources includes:
   using a weight applied to a first grouping of the plurality of data sources to determine whether to gather data from the first grouping of the plurality of data sources;
   using a data source identity within a second grouping of the plurality of data sources to determine whether to gather data from the second grouping of the plurality of data sources; and
   using a data source popularity within a third grouping of the plurality of data sources to determine whether to gather data from the third grouping of the plurality of data sources.

3. The method of claim 2, further comprising:
   providing, via the processor, the administrator of the networked community with the ability to instruct a gathering of data from at least one of the plurality of data sources at any particular moment; and
   providing, via the processor, the administrator of the networked community with the ability to assign the weight applied to the first grouping of the plurality of data sources.

4. The method of claim 3, wherein the settings associated with the second at least one member of the networked community are determined by preferences set by the second at least one member of the networked community.

5. The method of claim 4, further comprising:
   electronically providing, via the processor, a page for members of the networked community to interact with the analyzed data.

6. A computing device configured to analyze and disseminate data within a networked community, comprising:
   a processor;
   memory in electronic communication with the processor; and
   instructions stored in the memory, the instructions being executable by the processor to:
      determine whether to gather data from within a plurality of data sources for analysis;
      gather data from the plurality of data sources according to a frequency assigned by an administrator of the networked community;
      grant a first at least one member of the networked community the ability to contribute data to the networked community;
      provide the administrator of the networked community with a set of data gathered from the plurality of data sources and the first at least one member of the networked community for analysis;

provide the administrator of the networked community with the ability to analyze the set of data, in part by determining a portion of data within the set of data to disseminate and further in part by determining how the portion of data should be disseminated;

disseminate analyzed data to a second at least one member of the networked community according to settings associated with the second at least one member of the networked community;

compare data traffic in the set of data to an historical average of traffic data associated with at least one of the plurality of data sources;

determine whether the data traffic in the set of data satisfies a predetermined range of data traffic based on the historical average of traffic data;

upon determining the data traffic in the set of data satisfies the predetermined range of data traffic, generate a post and sending the post to the administrator of the networked community;

sort a plurality of posts by category;

bundle posts of one category into a thread, the thread enabling members of the network community to view the bundled posts by selecting the thread; and append one or more intelligence briefs to the thread of bundled posts, the intelligence briefs providing client strategy and guidance in relation to the category of the bundled posts.

7. The computing device of claim 6, wherein the instructions are executable by the processor to:

use a weight applied to a first grouping of the plurality of data sources to determine whether to gather data from the first grouping of the plurality of data sources;

use a data source identity within a second grouping of the plurality of data sources to determine whether to gather data from the second grouping of the plurality of data sources; and use a data source popularity within a third grouping of the plurality of data sources to determine whether to gather data from the third grouping of the plurality of data sources.

8. The computing device of claim 7, wherein the instructions are executable by the processor to:

provide the administrator of the networked community with the ability to instruct a gathering of data from at least one of the plurality of data sources at any particular moment; and provide the administrator of the networked community with the ability to assign the weight applied to the first grouping of the plurality of data sources.

9. The computing device of claim 8, wherein the settings associated with the second at least one member of the networked community are determined by preferences set by the second at least one member of the networked community.

10. The computing device of claim 9, wherein the instructions are executable by the processor to:

electronically provide a page for members of the networked community to interact with the analyzed data.

11. A computer-program product for analyzing and disseminating, by a processor, data within a networked community, the computer-program product comprising a non-transitory computer-readable medium having instructions thereon, the instructions being executable by the processor to:

determine whether to gather data from within a plurality of data sources for analysis;

gather data from the plurality of data sources according to a frequency assigned by an administrator of the networked community;

grant a first at least one member of the networked community the ability to contribute data to the networked community;

provide the administrator of the networked community with a set of data gathered from the plurality of data sources and the first at least one member of the networked community for analysis;

provide the administrator of the networked community with the ability to analyze the set of data, in part by determining a portion of data within the set of data to disseminate and further in part by determining how the portion of data should be disseminated; and disseminate analyzed data to a second at least one member of the networked community according to settings associated with the second at least one member of the networked community;

compare data traffic in the set of data to an historical average of traffic data associated with at least one of the plurality of data sources;

determine whether the data traffic in the set of data satisfies a predetermined range of data traffic based on the historical average of traffic data;

upon determining the data traffic in the set of data satisfies the predetermined range of data traffic, generate a post and sending the post to the administrator of the networked community;

sort a plurality of posts by category;

bundle posts of one category into a thread, the thread enabling members of the network community to view the bundled posts by selecting the thread; and append one or more intelligence briefs to the thread of bundled posts, the intelligence briefs providing client strategy and guidance in relation to the category of the bundled posts.

12. The computer-program product of claim 11, the instructions further comprising:

use a weight applied to a first grouping of the plurality of data sources to determine whether to gather data from the first grouping of the plurality of data sources;

use a data source identity within a second grouping of the plurality of data sources to determine whether to gather data from the second grouping of the plurality of data sources; and using a data source popularity within a third grouping of the plurality of data sources to determine whether to gather data from the third grouping of the plurality of data sources.

13. The computer-program product of claim 12, wherein the instructions are executable by the processor to:

provide the administrator of the networked community with the ability to instruct a gathering of data from at least one of the plurality of data sources at any particular moment; and provide the administrator of the networked community with the ability to assign the weight applied to the first grouping of the plurality of data sources.

14. The computer-program product of claim 13, wherein the settings associated with the second at least one member of the networked community are determined by preferences set by the second at least one member of the networked community.

15. The computer-program product of claim 14, wherein the instructions are executable by the processor to:

electronically provide a page for members of the networked community to interact with the analyzed data.

* * * * *